UNITED STATES PATENT OFFICE.

DAMON R. AVERILL, OF NEW CENTREVILLE, NEW YORK, AND JOSIAH BROWNING, OF NEWBURG, OHIO.

IMPROVEMENT IN THE MANUFACTURE OF PAINTS.

Specification forming part of Letters Patent No. 121,147, dated November 21, 1871.

*To all whom it may concern:*

Be it known that we, DAMON R. AVERILL, of New Centreville, in the county of Oswego and State of New York, and JOSIAH BROWNING, of Newburg, in the county of Cuyahoga, State of Ohio, have invented certain new and useful Improvements in Paint, of which the following is a full and complete specification:

This invention relates to a simple method of rendering paint less expensive and at the same time giving it consistency, and lessening its liability to run, as is the case of ordinary paint, and which also has a tendency to increase its gloss and durability. It also has the property or quality of filling nail-holes, cracks, &c., without running therefrom.

As an example, from many, for preparing this paint, and which may be varied so as to adapt it to the nature of the work required, we make this example relate to the use of the oxide of zinc or the carbonate of lead.

Take one hundred pounds of the oxide of zinc, to which is added about four gallons of water, hot or cold, with or without distillation. With this water the pigment (oxide of zinc or carbonate of lead) is ultimately mixed. To this mixture of water and pigment we add a sufficient quantity of linseed oil or other drying oils, or their equivalents, with or without turpentine or benzine, to render it of sufficient consistency to use as paint or coating, or any of the purposes for which paint may be used.

While this example is given only for the oxide of zinc and carbonate of lead, other pigments may be used, such as ocher, Venetian-red, &c., and may be employed in place of the said zinc and lead, either separately or combined.

The proportion of the oil, water, and pigments may be varied to suit the different kinds of work without changing the nature of this invention or discovery.

What we claim as our invention, and desire to secure by Letters Patent, is—

The addition of water to pigments and oil in the order and in about the proportions substantially as described, and for the purpose set forth.

DAMON R. AVERILL.
JOSIAH BROWNING.

Witnesses:
  J. H. BURRIDGE,
  D. L. HUMPHREY. (107)